May 16, 1967  
J. J. GALLAGHER  
WORKPIECE TRANSFER DEVICE WITH  
WORKPIECE HEAD GRIPPING JAWS  
3,319,826
Filed Sept. 14, 1965
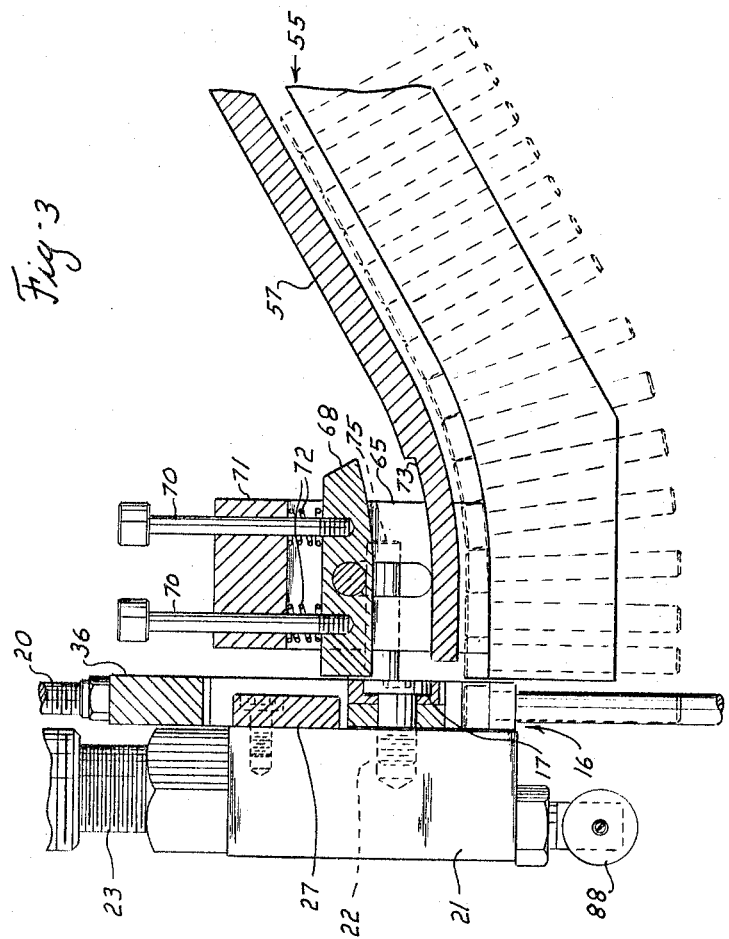
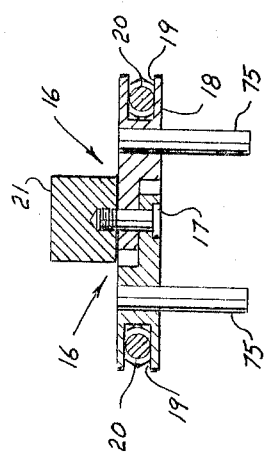
INVENTOR.  
James J. Gallagher  
BY  
Synnestvedt & Lechner  
ATTORNEYS

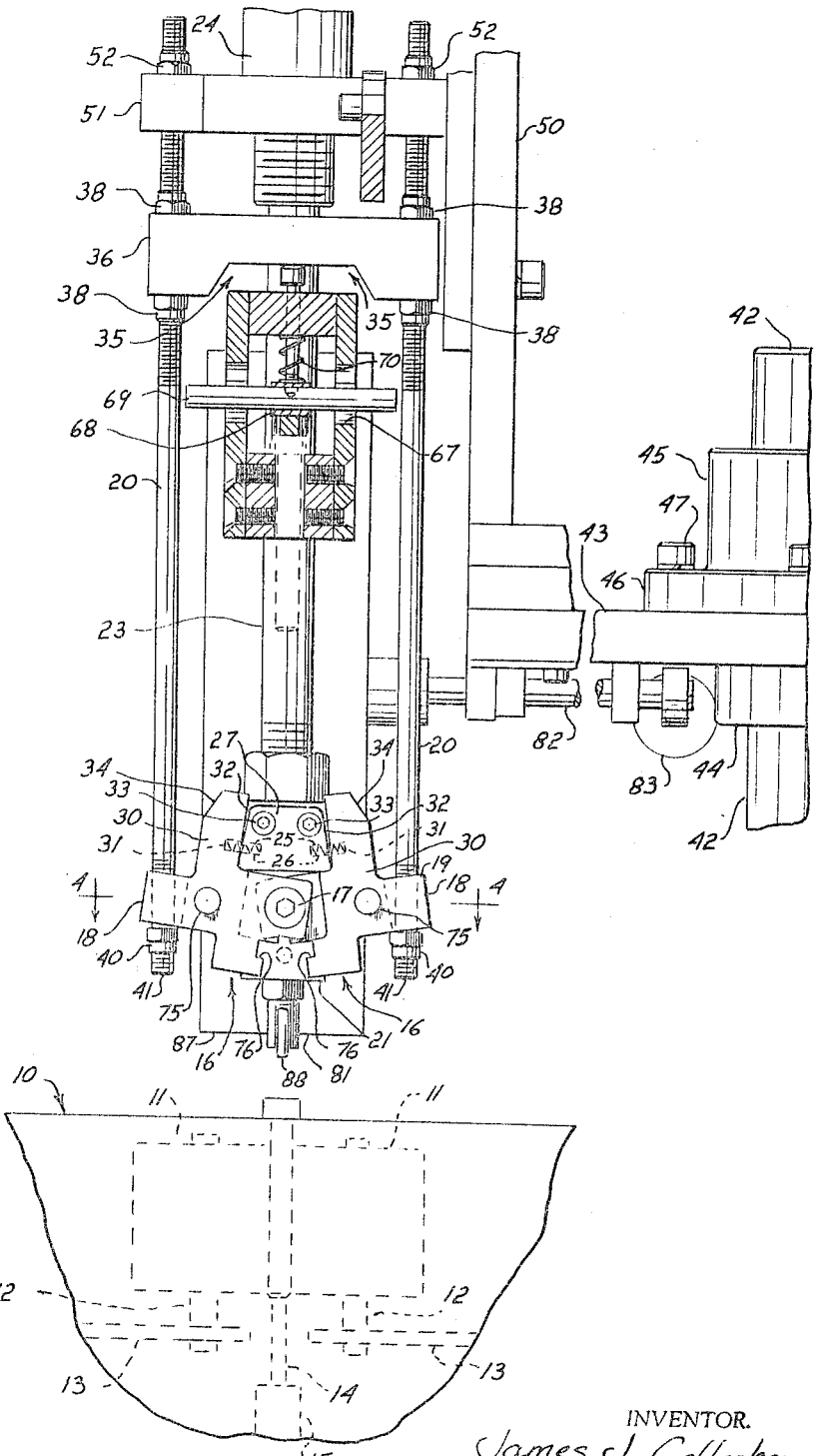

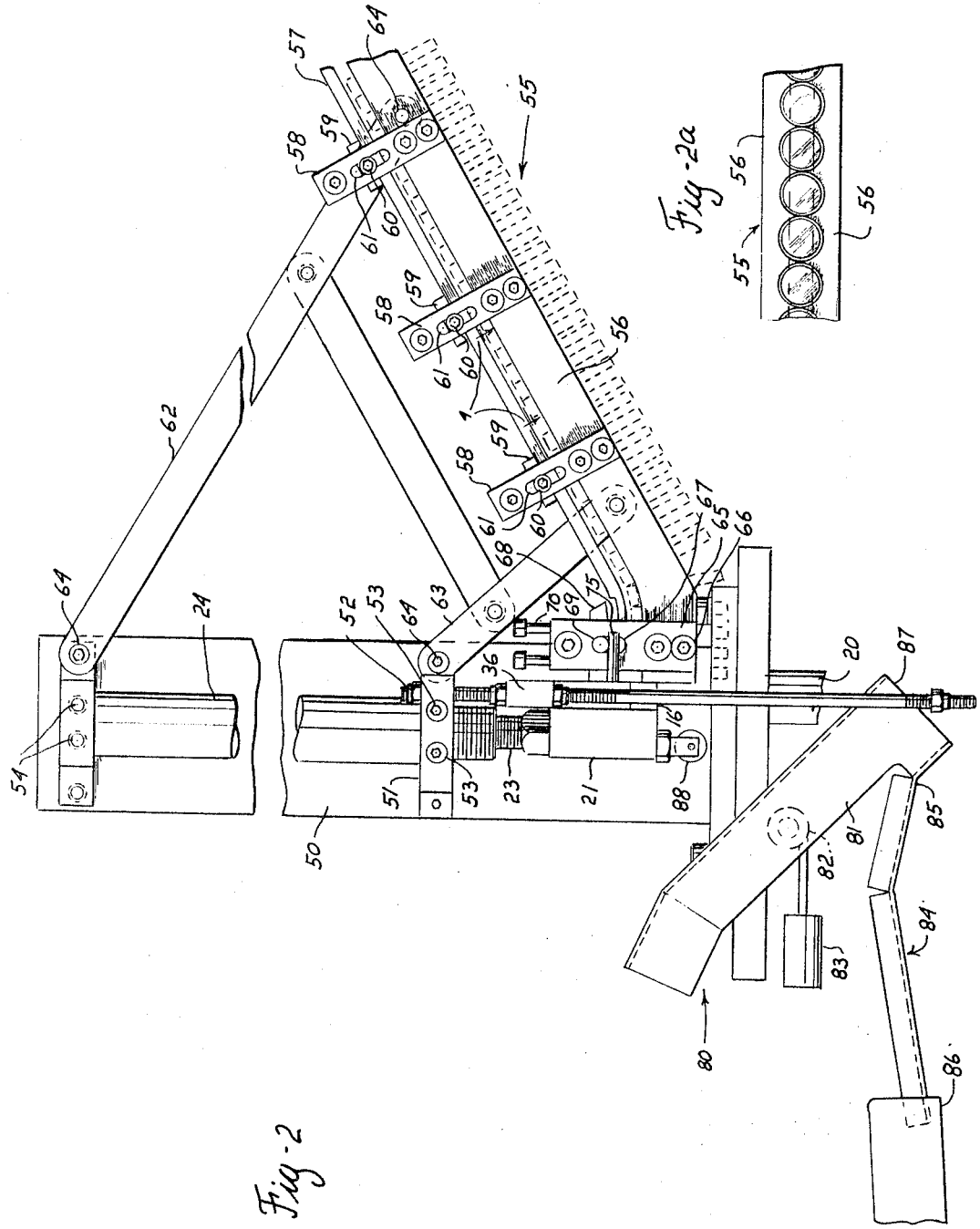

United States Patent Office 3,319,826
Patented May 16, 1967

3,319,826
WORKPIECE TRANSFER DEVICE WITH WORK-
PIECE HEAD GRIPPING JAWS
James J. Gallagher, Chalfont, Pa., assignor to Standard
Pressed Steel Co., Jenkintown, Pa., a corporation of
Pennsylvania
Filed Sept. 14, 1965, Ser. No. 487,205
8 Claims. (Cl. 221—210)

This invention relates to workpiece transfer apparatus, and more particularly to apparatus adapted to transfer elongated workpieces to a machine for treating the workpieces.

While not limited thereto, the apparatus is especially useful for feeding bolt blanks into top loading thread roll machines, and for guiding the finished workpieces away to a suitable collection point after the threads are rolled on the blank.

In the past, thread rolling machines of this type have ordinarily been loaded and unloaded by hand, requiring the constant attention of an operator. Considerable production time is lost while the operator selects and inserts each workpiece into such a machine and also when he removes the finished pieces after each machining or treatment operation. This type of work is not only costly and inefficient, but is rather tedious for the operator, especially during long production runs.

In view of the foregoing, a primary object of the invention is the provision of workpiece loading and unloading apparatus which makes possible substantially continuous operation of a production machine without the need for constant attendance by a machine operator.

A further object of the invention is the provision of a novel form of workpiece handling apparatus which makes possible much greater production rates than has heretofore been possible with equipment of this type.

Still another object of the invention is the provision of workpiece handling apparatus which has the qualities of simplicity and dependability necessary for sustained high speed production rates.

A further object of the invention is the provision of workpiece transfer apparatus which is capable of being mounted on a thread rolling machine with little or no modification of the machine itself.

The foregoing and other objects of the invention are achieved by means of a pair of cooperating transfer jaws which pick up and transfer the elongated workpieces from a guide track to a workpiece treatment station of the machine tool itself. Means are provided to open the jaws to receive a workpiece when they are aligned with the guide track. After a workpiece is moved into position between the jaws, it is gripped and moved by the jaws to the workpiece treatment station where it is released for treatment in the intended manner. Another aspect of the invention lies in the provision of a novel chute structure which is moved by the jaws into position to receive a workpiece when it is ejected from the machine after treatment. When the jaws recycle to transfer the succeeding workpiece to the machine, the chute is automatically moved aside.

Turning now to the illustrative embodiment, the manner of achieving the foregoing and other objects of the invention will become more fully apparent from the following description when taken in conjunction with the drawings in which:

FIGURE 1 is an elevational view, partly in section, of a preferred form of transfer device constructed in accordance with the principles of this invention;

FIGURE 2 is a side elevational view, on a reduced scale, of the apparatus shown in FIGURE 1;

FIGURE 2a is a plan view, of a portion of the apparatus shown in FIGURE 2;

FIGURE 3 is an enlarged vied, partly in section of a portion of the apparatus shown in FIGURE 2; and FIGURE 4 is a sectional view, with certain parts omitted for clarity, taken along lines 4—4 of FIGURE 1.

To afford a clear understanding of the principles of operation of the present invention, the illustrative embodiment is shown in association with a conventional top loading thread rolling machine such as "Reed" model A-22, a portion of which is shown schematically at 10 at the bottom of FIGURE 1.

For the purposes of understanding the invention, it is sufficient to state that this type of thread rolling machine is provided with three similarly shaped cylindrical thread rolling surfaces to simultaneously engage the shank of a workpiece and deform its surface to produce threads. The dies, two of which are shown in dashed lines at 11 in FIGURE 1, are normally spaced apart to permit positioning of a workpiece and thereafter move together so that the thread rolling surfaces grip and exert pressure against a workpiece shank. This is accomplished by mounting each die on a spindle 12, which is in turn supported on an arm 13. The arms 13 are moved by suitable cams (not shown) towards and away from the position shown, in order to allow the workpiece to be placed between the dies and thereafter to be firmly engaged therebetween. The dies are then rotated to complete the threading operation. When this is completed they are again cammed apart and an ejector pin 14 is moved rapidly upwardly by a pressure cylinder 15 to eject the threaded workpiece.

The illustrative embodiment of the invention includes a pair of workpiece engaging transfer jaw 16 (FIG. 1) which are pivoted on pivotal mounting means including pin or bolt 17. The jaws are provided with laterally extending arms 18, each of which has a generally U-shaped recess 19 (FIG. 4) for guiding the jaws in a vertical plane between a pair of aligned guide rods 20.

As may best be seen in FIGURE 3, the jaws 16 are mounted on a support block 21 by the threaded pin or machine bolt 17 which is threaded into a hole 22. One end of a piston rod 23 (FIG. 1) is secured to the upper end of the block 21. The piston rod is adapted to be vertically reciprocated by a piston slidably mounted in a two-way pneumatic or hydraulic pressure cylinder 24 of well known construction. With this arrangement, movement of the piston rod 33 moves the jaws 16 in a vertical path between a position of alignment with the terminal portion of a workpiece guide track 55, shown in FIGURES 2 and 3 and described hereinafter, and a position just over the top of the thread rolling machine 10.

The jaws 16 are urged to the closed position by means of a pair of springs 25 housed in recesses 26 in a block 27. Block 27 is located between upright arms 30, which, in the illustrative embodiment, form integral portions of the jaws 16. The springs 25 also seat in recesses 31 in arms 30, the recesses being in substantial alignment with the aforementioned recesses 26. The sides 32 of the block 27 are tapered slightly and define stops for controlling the extent of opening of the jaws 16. Block 27 is secured to the block 21 by suitable fastening means such a pair of machine screws 33.

The means for opening the jaws when they are in their upper or raised position will now be described. This includes the beveled upper surfaces 34 on each of the upright arms 30 and a cooperating beveled camming recess 35 located in a horizontal beam 36. The beam 36 is mounted on the guide rods 20 and is positioned over the jaws 16 so that recess 35 is in direct alignment with the bevels 34 on the arms 30. The beam 36 is preferably vertically adjustable by means of nuts 38 which are threaded on the guide rods 20 to provide for variations in the length of the path of travel and the amount that the jaws are to be opened. When the pressure cylinder 24 moves the jaws to the upper position, the beveled recess 35 and the cooperating bevelled surfaces 34 on the arms 30 engage and force the jaws to the open position. As soon as the jaws again move downwardly they are free to pivot about the pin 17 under the urging of the springs 25 and thus, firmly grip a workpiece which has been fed into position between their opposed gripping surfaces. When the jaws move downwardly to the position shown in FIGURE 1, arms 18 strike nuts 40, adjustably mounted on the threaded ends 41 of the guide rods 20. This causes pivotal movement of the jaws against the urging of the springs 25. The nuts are adjusted with respect to the length of stroke of the piston rod so that the jaws are then opened sufficiently to release the workpiece.

The apparatus described above is supported on a vertical spindle 42 (FIGURES 1 and 2) which may be secured to one side of the thread rolling machine. The spindle 42 carries a transverse arm 43 which is mounted for movement in a transverse plane from a position in which the jaws are in vertical alignment with the thread rolling dies and a retracted position to which the apparatus may be moved to allow for maintenance or hand feeding of the thread rolling machine. The arm 43 is supported by means of a collar 44 secured to the spindle 42. A second collar 45 is mounted on the spindle and may be releasably secured thereto by means of a suitable set screw. The collar 45 has a flange 46 which is provided with threaded apertures to receive set screws 47. When tightened, the set screws 47 engage and clamp the arm 43 in adjusted position.

Arm 43 carries an upright support plate 50 (FIG. 2). A generally U-shaped bracket 51 is bolted to the support plate 50 and is provided with apertures which are threaded to receive and support the threaded upper ends of the guide rods 20. Nuts 52 are also threaded on the upper ends of each of the guide rods 20 and serve to hold the guide rods in adjusted position.

As is best shown in FIGURE 2, the pressure cylinder 24 is mounted on the plate 50 by means of machine screws 53 on the bracket 51 and also by machine screws 54 on a second bracket 54a.

The apparatus for sequentially guiding the workpieces into position to be picked up by the jaws is shown generally at 55 at the right hand side of FIGURE 2, and includes a pair of guide plates or tracks 56, spaced apart in side-by-side relationship. Tracks 56 are spaced to provide clearance for the shank of a workpiece so that such workpiece is free to slide between them with the underside of its head resting on the upper surface of the track (see FIGURE 2a). A cover member 57 is spaced about the track 56, a distance slightly greater than the height of the workpiece head. Means are provided including brackets 58 to vary the track dimensions to accommodate workpieces having differing head and shank dimensions. Head height adjustment is achieved by means of clamping screws 60 which ride in slots 61 on the brackets 58 and are threaded into brackets 59 on the cover plate. By loosening the screws 60, the cover plate 57 is freed for vertical movement within the limits of the long dimension of the slot 61.

Variations in shank thickness may be compensated for by inserting different sized spacer members between the brackets 58.

Workpieces may be loaded in the track 56 by hand, or if desired, by means of various known feeding devices. For instance, a vibratory parts feeder, not shown, of the type made by Vibrating Feeder Company of Erie, Pennsylvania, may be used.

The guide track structure 55 is supported by arms 62 and 63 which are bolted to the track and to the upright plate 50 by means of machine bolts 64.

In order to prevent the movement of the workpieces from out of the terminal portion of the track, after the jaws move downwardly, I provide the track with a novel stop arrangement which includes a pair of identically shaped upright brackets 65 located adjacent the upper position of the jaws. The brackets 65 are secured to each of the plates 56 by means of machine screws 66. Brackets 65 are provided with aligned, identically shaped, elongated slots 67. A stop bar 68 is provided with pins 69 which are slideably moveable within the confines of the slots 67. The stop bar 68 also carries a pair of upright guide pins 70 shown in FIGURE 3, which are slideably mounted in holes drilled in a transverse brace 71 bolted to each of the upright brackets 65. A pair of springs 72 ride on the shanks pins 70 between the upper surfaces of the stop bar 68 and the lower surfaces of brace 71 and urge the stop bar downwardly. Although the stop bar 68 could bear directly down on the heads of the workpieces in order to restrain their movement, in the illustrative embodiment the bar engages a cut-away portion 73 on the cover plate 57. The cover plate 57 is unsupported in the region adjacent the point of transfer of the blanks to the jaws and its upper surface is cut away so that it is relatively resilient at that point. When bar 68 bears against the plate, it in turn bears down on the heads of the blanks or workpieces, thus preventing their further movement.

In order to release a workpiece for movement into position between the jaws 16, a pair of pins 75 are carried by each of the jaws, and these pins are located so that when the jaws move upwardly to their first position, the pins 75 engage and lift the pins 69 and consequently the stop bar 68. The resilient end portion of the cover member 57 is thereupon free to spring upwardly out of engagement with the heads of the workpieces. When this occurs, a workpiece is free to move off the end of the track into position between the jaws 16, which have been opened by engagement of the beveled surfaces 34 with the sides of the camming recess 35.

To support the workpiece as it moves between the jaws, I prefer to form the opposing gripping surfaces so that they generally conform to the cross-sectional dimension of the head of a workpiece. Thus, as is seen in FIGURE 1, a portion of the jaws are cut away to form a T shaped opening having ledges shown at 76 to support the underside of the head of a workpiece "W." At the point that the headed workpiece moves into position to be gripped by the gripping surfaces, the extent of movement of the jaws is limited by the camming means so that the head rests on the ledges 76.

To guide and convey the finished workpieces away from the thread rolling machine, the invention also provides a moveable guide chute structure generally designated by the numeral 80 in FIGURE 2. The preferred form of guide chute structure includes an elongated channel-like deflector member 81 of generally U-shaped cross-section, which is secured to a rotatably mounted shaft 82. A suitable biasing means such as a counter-weight 83 is also fixed on the shaft 82 and urges the deflector in a counter clockwise direction to the position shown in FIGURE 2. A guide conveyor 84 is secured at 85 below the deflector 81, and this conveyor leads to another chute or any suitable conveyor structure 86. In the preferred embodiment, the deflector member 81 and the conveyor 84 are formed from a box-like channel member which is cut along its long axis, the portions so formed being bent apart as shown in FIGURE 2. The deflector is urged by the counter weight 83 so that its open end 87 is directly over the thread rolling station of the machine. When the finished workpiece is ejected by the ejector pin 14, the piece is ejected upwardly into the confines of the channel-shaped deflector member. When it strikes the deflector member the workpiece is deflected down into the guide track 84, from which it moves by gravity into the conveyor 86.

The deflector member 81 and the guide chute 84 are moved away from the thread rolling station when the jaws move downwardly by means of a roller 88 which is mounted on the bottom of block 21 which supports the jaws 16. The roller 88 is positioned to strike the upper surfaces of the deflector 81 and to pivot it in a clockwise direction about the shaft 82 as the jaws move downwardly. Thus, when the jaws are in their lowermost position, the deflector is moved entirely out of the way; as soon as the jaws again move upwardly, counter weight 83 urges the deflector into position to catch the next ejected workpiece.

In the operation of the illustrative form of the invention, the headed workpieces slide down the elongated guide track 55, the heads of such workpieces sliding on the upper surfaces of the plate members 56. The stop mechanism including the downwardly biased stop member 68 and the end portion 73 of the cover plate 57 bear down on the heads of the workpieces at the terminal portion of the guide track to prevent their further movement. When the jaws move to the upper position, pins 67 engage the pins 69 and lift the stop member 68 so that the workpieces are freed for further movement. At this point, the jaws will be in the uppermost position with the T shaped opening 76 aligned with the terminal portion of the guide chute. The beveled edges of the arms 30 are moved inwardly upon engagement with the camming recess 35 causing the jaws to open to allow a workpiece to slide into position between the gripping surfaces. The extent of movement of the jaws is controlled by the dimensions and position of the camming recess 35, the opening being such that the workpiece is free to slide into the T shaped opening with the underside of the head being supported by the ledges 76 as may be seen in FIGURE 3. The block 21 prevents further sidewards movement of the workpiece.

As soon as the succeeding workpiece has been treated and is ejected by means of the pressure operated ejection pin 14, the jaws are moved downwardly by the pressure cylinder 24 and extensions 18 strike the nuts 40 as the jaws move to the second or lower position. Nuts 40 are positioned with respect to the path of travel of the jaws so that the jaws are opened far enough so that the ledges 76 move from under the head of the workpiece to allow the workpiece to drop into position between the thread rolling dies 11.

During the course of downward movement of the jaws, roller 88 strikes the upper surfaces of deflector member 81 and pivots the deflector out of the way as the jaws continue their downward movement. As soon as the jaws have released a workpiece they are returned to their upper position by the pressure cylinder 24. During this upward movement the deflector member is pivoted in the counter clockwise direction by the counter weight 83 until the open end 87 of the deflector member is in an intersecting position in the path of ejection of the treated workpiece.

The operation of the pressure cylinder 24 is to be synchronized with the operation of the thread rolling machinery by suitable means well known in the art; for instance, cam operated valve control members not shown may be provided to deliver pressure to one input of the piston when a workpiece has been ejected by ejection pin 14 and after a suitable delay the same means causes pressure to be delivered to a second port of the pressure cylinder to return the jaws to the uppermost position.

From the foregoing it may be seen that the invention permits substantially unsupervised operation of thread rolling and like machinery. With the invention, one operator can control a number of machines which need only be stopped for periodic maintenance or for adjustments to accommodate variations in the size of the part to be produced. The apparatus is relatively simple and dependable and while illustrated as a part feeder for a thread rolling machine the invention has obvious utility when used in conjunction with other types of production machinery of a similar nature.

I claim:
1. Apparatus for transferring elongated workpieces comprising a pair of workpiece engaging jaws having gripping surfaces facing each other, pivot means mounting said jaws for movement of said gripping surfaces towards and away from each other, drive means for reciprocating said jaws between first and second limits of travel, a camming block having a recess adjacent said first limit of travel, a camming surface on each of said jaws, said jaw camming surfaces being oriented to be engaged by the sides of the recess to open said jaws to receive a workpiece upon movement of the jaws to the first limit of travel, a pair of guide rods mounted on opposite sides of and extending parallel to the plane of movement of the jaws, said jaws each having a guide recess within which one of said guide rods is adapted to fit, said guide recesses being shaped to allow for pivotal movement of the jaws between the open and closed position, abutment members mounted on said guide rods adjacent said second limit of jaw travel, and abutment surfaces on said jaws spaced from said pivotal mounting means, said abutment members being positioned in the path of aid abutment surfaces to open the jaws upon movement thereof to the second limit of travel.

2. Apparatus according to claim 1, wherein said abutment members are adjustable axially of the guide rods to thereby provide for adjustment of the pivotal movement of said jaws.

3. Apparatus according to claim 1, wherein said jaw gripping surfaces form a generally T-shaped opening within which the head of the headed workpiece is adapted to be received.

4. Apparatus according to claim 3, wherein said headed piece is a bolt blank.

5. Apparatus according to claim 1, further including a guide track for feeding workpieces to said transfer apparatus, said guide track comprising a pair of spaced apart rails having a terminal portion adjacent the first limit of travel of said jaws;
said rails having surfaces adapted to support the head of a workpiece for sliding movement to said terminal portion; said terminal portion being positioned to feed the head of a workpiece into the T shaped opening upon movement of the jaws to the first limit of travel; and
stop means connected to said track for blocking movement of workpieces when the jaws are away from the first limit of travel, and a projection on said jaws for retracting said stop means to release a workpiece upon movement of the jaws to the first limit of travel.

6. Apparatus according to claim 5, wherein said stop means includes a resilient workpiece head engaging bar, means biasing said head engaging bar downwardly into engagement with the heads of workpieces at the terminal portion of the track, said projection being engageable with said biasing means to remove the bias on said head engaging bar when the jaws move to the first limit of travel.

7. In a workpiece treating apparatus having a treatment station for treating elongated workpieces and having an ejection mechanism for axial ejection of a workpiece subsequent to a treatment operation, the combination comprising:
a pair of workpiece gripping jaws for transferring workpieces from a first position to said workpiece treatment station;
means for reciprocating said jaws between said first position and said workpiece treatment station;
jaw opening means adjacent said treatment station and engageable with said jaws to release a workpiece upon movement thereof to the treatment station;
a pivotally mounted deflector member spaced above said treatment station, said deflector member having a deflector portion moveable into a position into the path of workpieces ejected by said ejection mechanism to deflect ejected workpieces away from said treatment station;

means biasing said portion into said position; and abutment means connected to the jaws and engageable with said deflector portion upon movement of said jaws towards said workpiece treatment station to pivot the deflector out of the path intersecting position during the transfer of a workpiece to said treatment apparatus.

8. Apparatus according to claim 7, further including a guide chute connected to said deflector member, said guide chute being positioned below said deflector member in position to receive and convey away workpieces deflected by the deflector member.

References Cited by the Examiner

UNITED STATES PATENTS

| | | | |
|---|---|---|---|
| 230,638 | 8/1880 | King | 221—251 X |
| 1,195,718 | 8/1916 | Pembrooke | 221—210 X |
| 1,297,983 | 3/1919 | Anderson | 221—210 |
| 2,373,436 | 4/1945 | Treciokas | 221—238 X |

SAMUEL F. COLEMAN, *Primary Examiner.*